US012596732B2

(12) United States Patent
Subbiah et al.

(10) Patent No.: US 12,596,732 B2
(45) Date of Patent: Apr. 7, 2026

(54) GENERATIVE ARTIFICIAL INTELLIGENCE (AI) CONSTRUCTION SPECIFICATION INTERFACE

(71) Applicant: Autodesk, Inc., San Francisco, CA (US)

(72) Inventors: Surendran Subbiah, Garden City, KS (US); Mo Han, Boston, MA (US); Vikas Sakaray, Bengaluru (IN); Varadarajulu Pyda, Ashburn, VA (US); Patricia Keaney, Greenbrae, CA (US); Graham Michael Garland, San Francisco, CA (US); Beatriz Chinelato Guerra, San Antonio, TX (US); Gopi Krishna Nuti, Bengaluru (IN)

(73) Assignee: AUTODESK, INC., San Francisco, CA (US)

( * ) Notice: Subject to any disclaimer, the term of this patent is extended or adjusted under 35 U.S.C. 154(b) by 0 days.

(21) Appl. No.: 18/946,571

(22) Filed: Nov. 13, 2024

(65) Prior Publication Data

US 2025/0156455 A1    May 15, 2025

Related U.S. Application Data

(60) Provisional application No. 63/598,341, filed on Nov. 13, 2023.

(51) Int. Cl.
| | |
|---|---|
| *G06F 16/00* | (2019.01) |
| *G06F 16/3329* | (2025.01) |
| *G06F 16/3332* | (2025.01) |
| *G06F 40/30* | (2020.01) |

(52) U.S. Cl.
CPC ...... *G06F 16/3329* (2019.01); *G06F 16/3335* (2019.01); *G06F 40/30* (2020.01)

(58) Field of Classification Search
CPC .......................... G06F 16/3329; G06F 16/3335
See application file for complete search history.

(56) References Cited

U.S. PATENT DOCUMENTS

| | | | | |
|---|---|---|---|---|
| 12,039,263 | B1 * | 7/2024 | Mondlock | G06F 40/20 |
| 12,235,882 | B1 * | 2/2025 | Chawla | G06F 16/285 |
| 12,254,272 | B1 * | 3/2025 | Cetoli | G06F 40/40 |
| 12,277,489 | B1 * | 4/2025 | Pradeep Shetty | G06N 3/0455 |
| 12,353,469 | B1 * | 7/2025 | Mahabadi | G06F 16/332 |

(Continued)

OTHER PUBLICATIONS

PCT International Search Report & Written Opinion dated Jan. 16, 2025 for PCT Application No. PCT/US2024/055731.

*Primary Examiner* — Noosha Arjomandi
(74) *Attorney, Agent, or Firm* — Gates & Cooper LLP

(57)    ABSTRACT

A method and system provide the ability to process a construction domain query. A natural language user query is obtained within a construction software system. The user query is pre-processed to validate the query. Text from the query is embed into search vectors for a semantic search. A data source having multiple different sections is obtained. The semantic search is performed within each of the sections and identifies semantically relevant sections. The relevant sections are consolidated into a contextual data prompt that is input into an LLM. The LLM, which is trained based on construction data, generates a response that identifies the relevant sections. The response and an identification of the relevant sections is output.

18 Claims, 15 Drawing Sheets

(56) References Cited

U.S. PATENT DOCUMENTS

| 2018/0052823 A1* | 2/2018 | Scally | G06F 40/284 |
| 2022/0036153 A1* | 2/2022 | O'Malia | G06F 40/40 |
| 2023/0259705 A1* | 8/2023 | Tunstall-Pedoe | G06N 3/0499 |
| | | | 704/9 |
| 2024/0242154 A1* | 7/2024 | Jindal | G06Q 10/0637 |
| 2024/0273793 A1* | 8/2024 | DeCharms | G06F 40/197 |
| 2024/0394571 A1* | 11/2024 | Ivaturi | G06N 5/04 |
| 2024/0403776 A1* | 12/2024 | Krishna | G06Q 10/06375 |
| 2025/0061139 A1* | 2/2025 | Levinson | G06F 16/3326 |
| 2025/0086211 A1* | 3/2025 | Bolcer | G06F 16/3344 |
| 2025/0111192 A1* | 4/2025 | Bayless | G06N 3/006 |
| 2025/0124235 A1* | 4/2025 | Bursztyn | G06F 40/30 |
| 2025/0131247 A1* | 4/2025 | Mondlock | G06N 5/022 |
| 2025/0156419 A1* | 5/2025 | Shah | G06F 16/254 |
| 2025/0156455 A1* | 5/2025 | Subbiah | G06F 16/3335 |
| 2025/0200100 A1* | 6/2025 | Hintz | G06F 40/40 |
| 2025/0217572 A1* | 7/2025 | DeCharms | G06F 40/197 |
| 2025/0238418 A1* | 7/2025 | Narayanam | G06F 40/40 |

* cited by examiner

*Generate Benchmark for
Text Generation Step* — 202

*Generate Benchmark for
Information Retrieval Step* — 204

*Generate Benchmark for
Full Pipeline* — 206

GENERATIVE ARTIFICIAL INTELLIGENCE (AI) CONSTRUCTION SPECIFICATION INTERFACE

CROSS-REFERENCE TO RELATED APPLICATIONS

This application claims the benefit under 35 U.S.C. Section 119(e) of the following and commonly-assigned U.S. provisional patent application(s), which is/are incorporated by reference herein:

Provisional Application Serial No. 63/598,341, filed on Nov. 13, 2023, with inventor(s) Surendran Subbiah, Mo Han, Theerath Geddada, Varadarajulu Pyda, Patricia Keaney, Graham Michael Garland, Beatriz Chinelato Guerra, and Gopi Krishna Nuti entitled "Generative Artificial Intelligence (AI) Specification Interface".

BACKGROUND OF THE INVENTION

1. Field of the Invention

The present invention relates generally to construction specifications, and in particular, to a method, apparatus, system, and article of manufacture for analyzing and accessing information in a construction specification.

2. Description of the Related Art

Work/construction specifications are documents that cover detailed information on projects. They are often extremely long and detailed, making them difficult to parse, use and obtain meaningful information. Searches are often long and labor intensive. For example, if the construction specification document is 1000 pages and a user needs information on a particular faucet flow rate, it's likely going to take quite a bit of time to gather. There exists a need for a faster, more efficient way of obtaining information.

In view of the above, it may be noted that construction data is used in various parts of the construction project lifecycle. Such construction data includes design data, planning data, project management data, etc. All data may be available in a single platform, but project teams doing day-to-day tasks are required to retrieve information (in real time) from different locations where the relevant data for that team is siloed. For example, various project teams may encounter issues happening in the field or with the design such as requests for information (RFIs) being received/logged into a system, schedules with upcoming activities, assets being installed, forms/checklists filled out by contractors, etc. In this regard, a contractor may need to determine open issues such as which RFIs need to be addressed before a crew arrives on a jobsite or whether specific information required for an RFI has been entered in the project/construction specification. In other words, relevant information for different aspects of a project is siloed within a construction system platform. What is needed is the capability to quickly and efficiently access the relevant information regardless of how/where it is siloed/stored within a construction system platform.

SUMMARY OF THE INVENTION

Embodiments of the invention allow users to add a construction specification and/or other construction data to a construction project interface and use a natural language query to draft (e.g., a document, email, file, etc.), and/or gather/retrieve desired information.

BRIEF DESCRIPTION OF THE DRAWINGS

Referring now to the drawings in which like reference numbers represent corresponding parts throughout.

DETAILED DESCRIPTION OF THE INVENTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Figure 1:
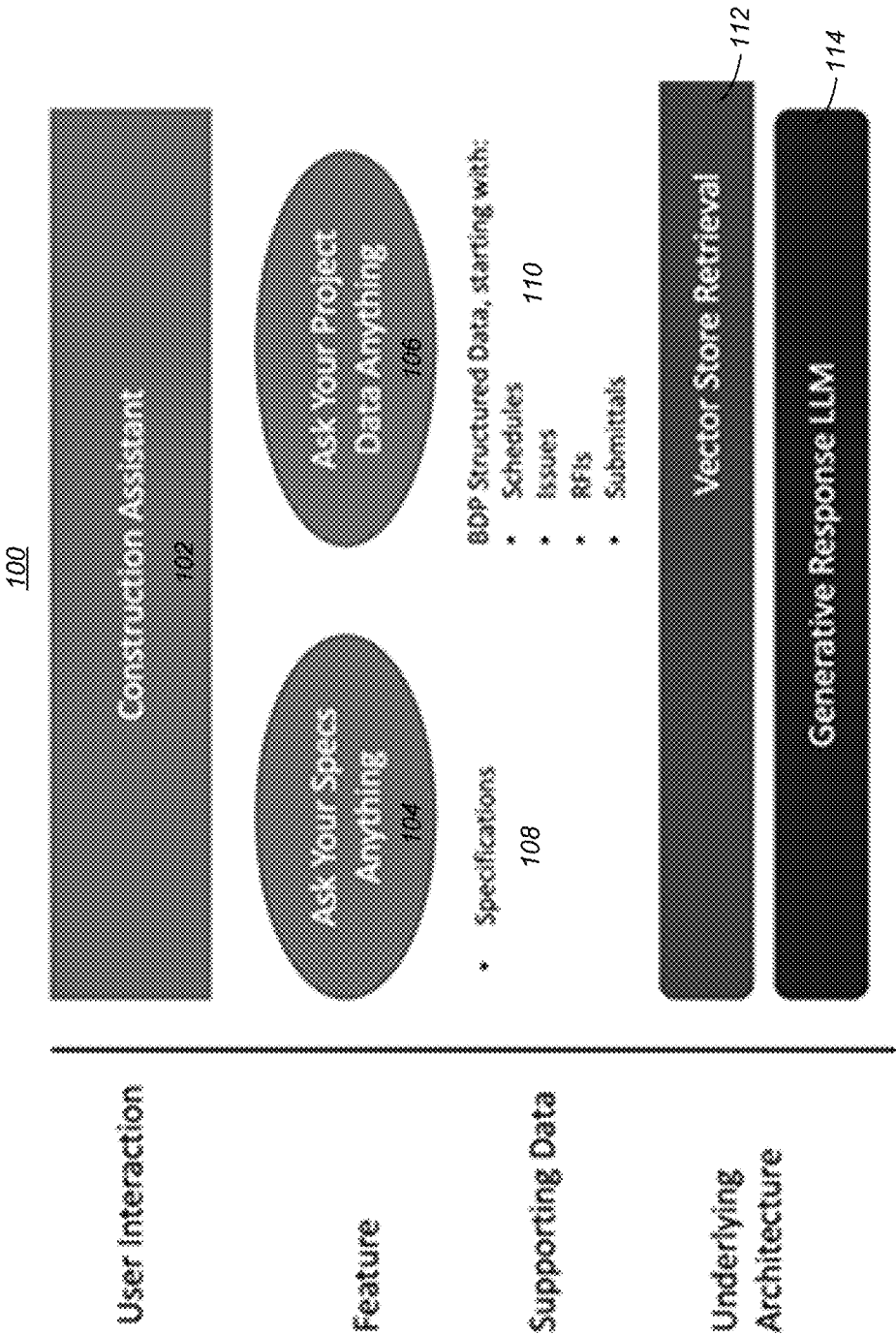
FIG. 1 illustrates an overview of the architecture for providing generative artificial intelligence (AI) information in accordance with one or more embodiments of the invention.

FIG. 1 illustrates an overview of the architecture for providing generative artificial intelligence (AI) information in accordance with one or more embodiments of the invention. The features of the invention are provided within a construction cloud management system 100 (e.g., the AUTODESK CONSTRUCTION CLOUD (ACC) available from the assignee of the present invention).

Within construction cloud management system 100, a "Construction Assistant" 102 provides the user interface/interaction.

The generative AI of embodiments of the invention provide features that allow a user to ask anything and retrieve data from (1) a lengthy specification (referred to as "ask your specs anything" 104) and/or (2) project management data (referred to as "ask your project data anything" 106).

In this regard, the supporting data for the Ask Your Specs Anything 104 consists of the specifications 108. The supporting data for the Ask Your Project Data Anything consists of BDP (big data protocol) structured data such as schedules, issues, RFI, submittals, etc. 110.

The underlying architecture for the features are provided via the vector store retrieval 112 and a generative response Large Advanced Language Models (LLMs) 114. In this regard, the features 105-106 leverage LLMs 114 and allow customers to ask questions and extract insights from their documents as well as project data such as schedule, issues, RFIs, submittals, etc. 110.

Further, embodiments of the invention may also include the ability to retrieve other documents besides specifications such as drawings, contracts, etc.

The Construction Assistant 102 allows customers to truly take advantage of having all their project management data on a single platform. This capability allows users to easily find information and extract insights by: (1) asking questions in natural language to their project data and documents; (2) creating ad-hoc analysis; (3) creating drafts; and (4) getting different kinds of assistance.

Technical Summary—Leveraging Advanced Language Models for Enhanced Construction Data Analysis and Customer Interaction In the dynamic field of construction, access to accurate and timely information is of paramount importance. Embodiments of the invention provide a technological suite that integrates two cutting-edge applications of large language models: "Retrieval-Augmented Generation (RAG) and Generative Language Models" and "Language Model Agents", aimed at revolutionizing how construction documents are handled and how customer queries are addressed. Specifically, below are summaries of these different capabilities:

RAG and Generative Language Models for Construction Document Inquiry

To streamline the interrogation of construction documents, embodiments of the invention harness the power of RAG alongside Generative Language Models. This innovative approach allows for the asking and answering of complex questions directly within construction documents. The process is bolstered by custom preprocessing algorithms designed to meticulously extract and index information, thereby transforming unstructured data into a rich, searchable repository. Subsequent post-processing ensures that the generated responses are accurate, relevant, and tailored to the nuanced needs of the construction domain.

Language Model Agents for Customer Interaction in Construction Projects

Embodiments of the invention provide Language Model Agents that redefine customer service by providing smart, contextual responses to inquiries related to construction projects. When a customer question is received, the agent devises a strategic plan to navigate the query through a maze of structured and unstructured data relevant to the construction project. This includes routing the question to appropriate sources, whether they be databases, project documents, or real-time construction updates. Each step of the information retrieval process is validated to ensure the accuracy and relevancy of the response. Finally, the construction assistant, powered by sophisticated algorithms, delivers a comprehensive and precise answer to the customer.

Continuous Refinement of AI Models Using Construction Project Data

The true potential of the AI-driven solutions of embodiments of the invention is unlocked through the continuous learning and adaptation of the models. By systematically harnessing the wealth of data generated during construction projects, both Generative and Embedding models, including Language Models (LLMs), are fine-tuned and trained from scratch, to become more attuned to the construction industry's evolving landscape. This iterative refinement process leverages project performance data, such as issues, RFIs, specifications, takeoff data, locations data, submittals, specifications, schedule, change orders, cost and feedback loops to enhance the models' understanding and predictive capabilities. As the models ingest more data, they become increasingly proficient in anticipating project trends, potential delays and risks, and become more effective in surfacing relevant information to customers, thus becoming invaluable tools for decision-making and strategic planning. Furthermore, this ongoing model training approach ensures that the AI systems stay up to date with the latest construction methodologies, materials, regulations, and sustainability practices. By doing so, embodiments of the invention not only improve the relevance and precision of AI responses but also contribute to the broader goal of advancing the construction industry through informed, data-driven insights.

Detailed Description of "Ask Your Specification Anything"

As described above, the Ask Your Specs feature may be a part of a "Construction Assistant," a component that works across a construction management system (e.g., AUTODESK BUILD available from the assignee of the present invention). The Construction Assistant may include many features including the "Ask Your Project Data Anything" described below.

Problem Statement

Specifications are large text-based documents that hold project information that is critical throughout the project lifecycle. Specifications are contractual documents used on all large projects as a companion to design documentation (2D plans and models). Specifications provide requirements information that define how the project will get built and also outlines the performance requirements for materials, products, and assets. Getting the information you need from the specification can be a challenge and is currently limited to a keyword search that returns a list of sources with no additional context or browsing the table of contents (TOC). Navigating these often 1000+ page documents manually is intensely time consuming. Users need a better way to extract and utilize the information they need from these specifications.

Value

Customer Value—Ask your Spec Anything helps customers more easily access critical project data in their specifications to get better insights to support decisions, avoid mistakes that lead to rework, cost overruns, project delays, and to enhance overall productivity in construction-related tasks. AI-powered "Ask your Spec Anything" lets users ask natural language questions or queries and get summarized responses and drafts with identified sources. This allows users to quickly get an answer to a specific question or extract summarized data across the specification. Finding accurate, critical project information quickly is essential to improving project outcomes.

Strategic Value—Ask your Specification Anything provides differentiated value to customers as part of an intelligent approach to Specifications in a construction cloud system.

In one or more embodiments, when provided with one or more PDFs, users have the capability to search for relevant keywords or pose questions in a natural language style. The search results not only include exact matches but also encompass texts that exhibit semantic similarity, along with an AI-generated answer according to the user query and retrieved document context. The answer provided by AI is generated and augmented based on the context retrieved from the original documents, which forms a RAG task.

Additional embodiments of the invention that enables exploration sessions with customers using their own data and in their own environments. This feature may remain behind a feature flag and can be turned on for specific customer engagements.

Solution Overview

Specifications may be used as a starting location for an "Ask your data" type generative AI interaction that will assist customers. Inputs to a solution in accordance with embodiments of the invention may include specification document(s) and a user query. Outputs from an exemplary model/system would include a generative answer to the user query.

Model Capabilities and Evaluation/Benchmarking

There are two components to this Ask Your Specs system that may be evaluated. The first is the retrieval step, where chunks of information from the specification are returned and may be evaluated for relevancy. The second is the Generative response, which takes the information provided from the retrieved chunks and creates an answer. This answer is evaluated for proper semantics, informational accuracy, and rate of hallucination.

As evaluation of the system may not be a perfect process against 100% true ground-truth data, embodiments of the invention may only evaluate the system based on potential customer questions. In this regard, it may not be possible to account for all possible questions. Likewise, an evaluation dataset of specifications may not cover all possible formats of specifications. Thus, specific metrics that are utilized may be an approximation of a model performance. As users interact at high volume, additional metrics may be generated and utilized.

There is a bit of a chicken and egg problem with evaluating two connected components (retrieval and generative response) in the same model. The generative responses are only as good as the retrieved chunks provided, and the retrieved chunks can only be measured on their impact to the generative answer. Neither can be evaluated without considering/controlling for the other. Accordingly, embodiments of the invention may generate and utilize benchmarks in evaluating the efficacy of a model.

Figure 2:
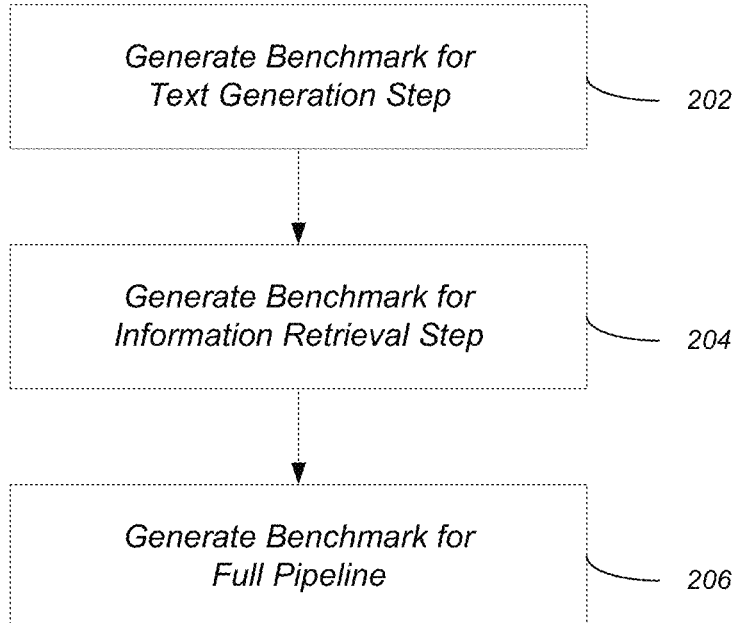
FIG. 2 illustrates the logical flow for generating the benchmark for acceptable criteria in accordance with one or more embodiments of the invention.

FIG. 2 illustrates the logical flow for generating the benchmark for acceptable criteria in accordance with one or more embodiments of the invention.

At step 202, a benchmark (for generative answers) is generated for the Text Generation Step (LLM+Text Generation Optimization). Benchmark generative answers are based on a percentage (%) of chunk relevancy controlling for one-hundred percent (100%) of relevant information. Benchmark generative answers may include:

(a) How much noise can be included in the returned chunks before the generative answers start to get confused and provide wrong answers? In this regard, more noise=presumed higher recall with less missed information. In contrast, less noise=higher precision with more missed information.

(b) Test with control chucks of pre-determined levels of noise. In this regard, with 100% relevant chunks—how well does the generative response do? For example, with 80% relevant chunks and 20% noise—how well does the generative response do?

(c) Determine the acceptable threshold of noise before generative responses significantly deteriorate. This provides a target minimum level of precision as well trying to expand the recall metrics on retrieval.

At step 204, a benchmark is generated for the Information Retrieval Step (Embedding Model+Information Retrieval Strategy). This step establishes benchmark retrieval metrics that consider acceptable levels of noise (from step 202).

Benchmark Retrieval Metrics May Include:

(a) How well can we optimize our precision and recall of chunks retrieved? In this regard, the True Positive (TP) Rate is relevant, a False Positive (FP) Rate reflects noise, and a False Negative (FN) Rate reflects missing information.

(b) This is evaluated at the chunk level, not the response level. For example, one response could have 10 chunks where 7 are relevant, 3 are noise, and 1 is missing. In such an example, the TP=7/10 0.700, FP=3/10 0.300, and FN=1/8 0.125.

It may be noted that the evaluation and metrics generation of steps 202 and 204 can happen in parallel.

At step 206, a benchmark is generated for the Full Pipeline. In this regard, the quality of the generative answers are benchmarked based on the currently optimal retrieval scores (from step 204). Benchmarks may include:

(a) Generative accuracy rate. The accuracy rate reflects whether the generative answer correctly returns the expected answer that an expert human would have generated. The accuracy rate may not consider why it may have made a mistake (missing info, etc.). Instead, it simply reflects whether the correct answer was provided or not;

(b) Proper semantic rate. The proper semantic rate reflects whether the answer makes sense grammatically and represents the underlying information in plain language terms. This may not be an evaluation of accuracy, but only of presentation.

(c) Hallucination Rate. The hallucination rate reflects how often the model invents an answer that does not exist in the data anywhere. Giving the "wrong" answer is not a hallucination if the information provided does exist in the text but is just contextually wrong.

Specifications Data

For the model evaluation, embodiments of the invention may utilize real-world construction specifications of a variety of project types. The selection of data for model evaluation may follow a phased approach. A qualitative evaluation of "Ask Your Specification" may have the objective of providing feedback to other team members (e.g., a data science team) on model behavior, patterns of mistakes, hallucination, or issues observed.

Detailed Description of "Ask Your Project Data Anything"

As described above, the Ask Your project data anything feature may be a part of the "Construction Assistant."

Problem Statement

The construction cloud platform of embodiments of the invention centralizes important construction management data—i.e., schedule data, issues, RFIs, submittals, correspondence, etc. While this data is in the cloud platform, it is still siloed in different tools and there is not an easy way for customers to gather insights about their data across tools. For example, if a customer would like to extract insights about which constraints (e.g., RFIs, issues, overdue submittals) will impact their next schedule activities they need to perform different searches, download data, and then cross-compare different data objects—making it a daunting task. In short, in the prior art, there is no easy way to gather insights about project management data that is in different tools and users need a better way to do that.

Value

Ask Your Project Data Anything will help customers more easily access critical project data in their projects to get better insights that support decisions, avoid mistakes that lead to rework, cost overruns, project delays, and to enhance overall productivity in construction-related tasks. AI-powered "Ask your Project Data Anything" lets users ask natural language questions across their project data and get summarized responses with identified sources. This capability lets users get easy insights that are based on multiple data sources such as RFIs, Issues, Submittals, correspondence, etc. This capability may also be combined with document queries such as the "Ask your specification" feature described above.

In addition to the above, Ask your Project Data Anything allows customers to truly take advantage of having all their construction management data in a single platform. This capability allows them to easily extract insights by asking questions to their project data.

Datasets and Use Case Examples

The description below exemplifies use cases of interest in which multiple personas ask different questions to their project data. In one or more embodiments, the dataset to be queried consists of issues, RFIs, schedules, costs, construction IQs (e.g., intelligence about a project such as risk, quality and safety information), and submittals. Embodiments of the invention may search/enable the capabilities to retrieve information from such datasets in the order in which such datasets are listed above.

Embodiments of the invention may select and utilize/prioritize the datasets identified above. In this regard, a schedule may be the top of mind and a key priority to any construction company. Meeting the milestones and keeping production in the field as planned is of paramount importance and has a direct impact in the overall project success. Issues, RFIs, and Submittals are also key data points that can represent constraints to meeting the project schedule. For example, an upcoming activity without its approved submittal can create delays; an upcoming activity with an unanswered RFI can cause delays. Additionally, Issues, RFIs, and Submittals also have a direct impact in the overall quality outcomes of a project. For example, an upcoming activity that has a related RFI may cause rework down the line, the installation of a product without its approved submittal may cause rework and cost overruns, etc. In summary, these data sources are very important to customers and allow embodiments of the invention to tackle multiple use cases.

Based on the above the following exemplary use cases may be provided by the Ask your Project Data Anything feature.

A first exemplary use case group is that of creating a lookahead schedule and identifying project constraints. For example, the input may consist of "Create a lookahead plan for the next 2 weeks and identify constraints for these activities." The relevant datasets that are queried may include schedule, issues, and RFIs. To respond to such a natural language query, embodiments of the invention may first identify the date (e.g., October 31-November 14). Based on the date range, the Schedule, Issues and RFIs datasets are queried/searched/filtered. For example, for the schedule dataset, a activities may be searched and filtered based on start date and finish date. Further, RFIs and Issues datasets may be filtered based on due date. Using a unique ID, other metadata of the Schedule, Issues, and RFIs from other tables may be mapped. Lastly, answers may be generated and tasks summarized based on the data queried and saved. For example, the model output may provide:

> Sure, here are the activities in the upcoming 2 weeks and the issues, and RFIs that I could identify related to them:
>
> Schedule Activities:
>> Floor decking (09/20/23-10/04/23)
>> Concrete First floor (10/04/23-10/25/23)
>> Stairwell and Elevator Walls (10/25/23-11/08/23)
>> Concrete Basement Slab (10/25/23-11/08/23)
>
> Critical data about the above tasks:
>
> Issues:
>> Issue 230—"Drawing Discrepancy: Floor finish"—Status: Pending
>
> RFIs:
>> RFI 2—"Missing soffit detail"—Status: Open
>> RFI 20—"Finish floor elevation"—Status: Open
>> RFI 60—Basement Slab Level—Status: Open A second exemplary use case within the same use case group may provide for model input of "Query all issues related to the schedule activities in the next 2 weeks". Relevant datasets for such a query may include the Schedules and Issues datasets. To generate a response, embodiments of the invention would first identify the date (e.g., October 31-November 14), then query the Schedule dataset based thereon (e.g., filtering by start and finish date), followed by mapping to other metadata of the Schedule dataset from other tables. A semantic search may then be performed on the Issues dataset (e.g., based on root causes and/or types). Thereafter, an answer may be generated and tasks summarized based on the data queried and saved. An exemplary model output may provide:

> Sure, here are the activities in the upcoming 2 weeks and the issues that I could identify related to them:
>
> Schedule Activities:
>> Floor decking (09/20/23-10/04/23)
>> Concrete First floor (10/04/23-10/25/23)
>> Stairwell and Elevator Walls (10/25/23-11/08/23)
>> Concrete Basement Slab (10/25/23-11/08/23)
>
> Issues:
>> Issue 230—"Drawing Discrepancy: Floor finish"—Status: Pending A third exemplary use case within the same use case group may have a model input of "Query all open RFIs related to the schedule activities in the upcoming 2 weeks." The Schedule and RFI datasets would the be the relevant datasets to query. In response, embodiments of the invention would identify the data and query the schedule based on the date range. Thereafter, the system would map to other metadata of the Schedule dataset and perform a semantic search over the RFI tables (e.g., based on the issue root cause and/or issue type). Metadata from the RFIs would then be mapped to other tables using a unique ID. Embodiments would then generate an answer and summarize tasks based on the data queried and saved. Exemplary model output may provide:

> Sure, here are the activities in the upcoming 2 weeks and the issues that I could identify related to them:
>
> Schedule Activities:
>> Floor decking (09/20/23-10/04/23)
>> Concrete First floor (10/04/23-10/25/23)
>> Stairwell and Elevator Walls (10/25/23-11/08/23)
>> Concrete Basement Slab (10/25/23-11/08/23)

RFIs:

eRFI 2—"Missing soffit detail"—Status: Open

RFI 20—"Finish floor elevation"—Status: Open

RFI 60—Basement Slab Level—Status: Open

A second exemplary use case group is that of prioritizing RFIs and Submittals. For example, an model input query may be "Prioritize my submittals according to the product lead times" which could query the Submittals dataset and result in the following exemplary output "Sure, not all submittals in this project include 'lead time'filled. However, according to the ones that include 'lead time', here is your list of submittals from ascending to descending: ( . . . )". Within this use case group, another exemplary model input query could be "Prioritize my open RFIs according to the risk". The relevant datasets would be RFIs and Construction IQ data with the potential model output of "Sure, I can see that for this project there are X open RFIs. Here is the prioritized list of them according to the risk, from high risk to low risk:( . . . )".

A third exemplary use case group is that of Ad hoc queries of project data. Within such use groups, the following provide potential model inputs and the corresponding relevant datasets:

| Model Input | Relevant Datasets |
| --- | --- |
| "Are there any RFIs related to . . . ?" | RFIs Construction IQ data |
| "What are my open high risk issues?" | Issues Construction IQ data |
| "Create a list of all my overdue submittals" | Submittals |
| "Create a list of overdue issues with ascending order, from most overdue to least overdue" | Issues |

Additional use cases may be explained with various fact patterns. For example, in addition the use cases described above, a fourth use case may prioritize RFIs and submittals. An exemplary fact pattern provides that a construction company is responsible for building a new state-of-the-art hospital in a rapidly growing urban area. The hospital is a critical project, with a tight schedule and rigorous quality and safety standards. As the construction project begins, an increasing number of RFIs and submittals are being submitted by various subcontractors, suppliers, and consultants. The project manager realizes that there is a growing backlog of RFIs and submittals waiting for review and response, but he doesn't know where to start. This backlog threatens to cause delays in the construction schedule and may hinder the project's overall progress if an important submittal is missed. As a result, the project manager needs assistance in prioritizing the RFIs and submittals according to the project schedule and lead time of items to be procured. The relevant data sources for such a fact pattern are the RFIs, Submittals, schedules, and relationships. The exemplary model input may provide "We have a significant backlog of RFIs and open submittals for our project, could you prioritize them based on the project schedule and lead time of items?".

A fifth use case is that of creating a lookahead schedule and identifying project constraints. For example, a construction company may be overseeing the development of a large, state-of-the-art commercial office building. The project involves multiple stakeholders, intricate designs, and an extensive list of subcontractors and suppliers. The superintendent for this complex project, is feeling the weight of his responsibilities. The project is reaching a critical phase, with multiple subcontractors and suppliers actively involved. Not having a solid lookahead plan increases the risk of missing a critical RFI, issue, or correspondence. As a result, the superintendent may need assistance creating a lookahead plan and identifying project constraints. The model input from the superintendent may be "I need an overview of the next two week's activities and a summary of open issues, RFIs, forms, and any correspondence related to these tasks. What's on the agenda?". The resulting affected datasets may include RFIs, issues, construction IQ (high risk issues and RFIs), schedules, Forms, Correspondence, and Relationships.

A sixth use case is that of conducting an activity history report. In this regard, suppose a project manager of a multi building residential complex was informed that there is a discrepancy on how much was billed and how much the owner's rep paid last month. Last month there were a lot of activities going on in the project, and the payment discrepancy came from the concrete cost code. To provide the necessary backup and demonstrate all the work performed, the project manager needs to look through the daily logs and correspondence to identify all concrete pours so they can provide proper documentation to the owner for payment. The model input from the project manager may be "Find all daily reports and correspondence about concrete pour activities. List and organize them by date. Create a draft summarizing which days concrete pours happened, what times, and which elements were completed." The relevant datasets may include Forms (daily reports), Correspondence, Cost, and Relationships.

In a seventh use case, a project manager or owner may be trying to prepare for a punch list. For example, with the project finish line in sight, the project manager knows that addressing the quality issues is crucial, as missing any important quality issue could result in delayed payments and affect the project's overall success. The owner's punch list and project walk-through date are coming soon, and it is a race against the clock to ensure everything is in order. Manually organizing the quality issues by status and project locations is a daunting task. The project manager needs assistance summarizing all open issues, assets status, open RFIs and forms according to the various project locations. The model input may be "I need assistance summarizing the quality issues and assets by status and according to project location in preparation for the owner's punch list. Also, please summarize any open RFIs and forms at this time." The relevant datasets would be Issues, Assets, Locations, RFIs, Forms, and Relationships.

In an eight use case a safety manager may be trying to summarize safety hazards for various projects. For example, suppose the safety manager of a construction company oversees the safety of several projects on a given week. Although safety is a responsibility of every person on the job, the manager likes to visit the jobs and perform detailed inspections and have conversations with subcontractors. This month, there are a lot of critical activities going on in several projects and the safety manager needs to optimize his time on each job. The safety manager needs to identify which subcontractors carry more risk on each project and verify that action items and safety issues that are still pending from previous inspections have been addressed. In such a scenario, the model input may be "I would like to know which subcontractors are carrying risk in each project, and whether there are any action items or issues still pending from the previous safety inspections." The relevant datasets that are queried may include Forms (daily safety inspection), Issues, Construction IQ (subcontractor's risk), and Relationships.

In a night use case, an area manager may need to identify project with delay and cost overrun risk. Suppose the area manager is overseeing multiple projects at the same time and trying to identify those with higher schedule variance and with most cost overrun risk. For this, he needs to analyze the schedule and the original fee and forecast fee for multiple projects. The model input may be "I need assistance identifying which projects have most schedule delays and have biggest discrepancy between original and target fee." The relevant datasets queried may include Cost, Schedule, and Relationships.

Generative AI Query Processing Logical Flow

Figure 3:
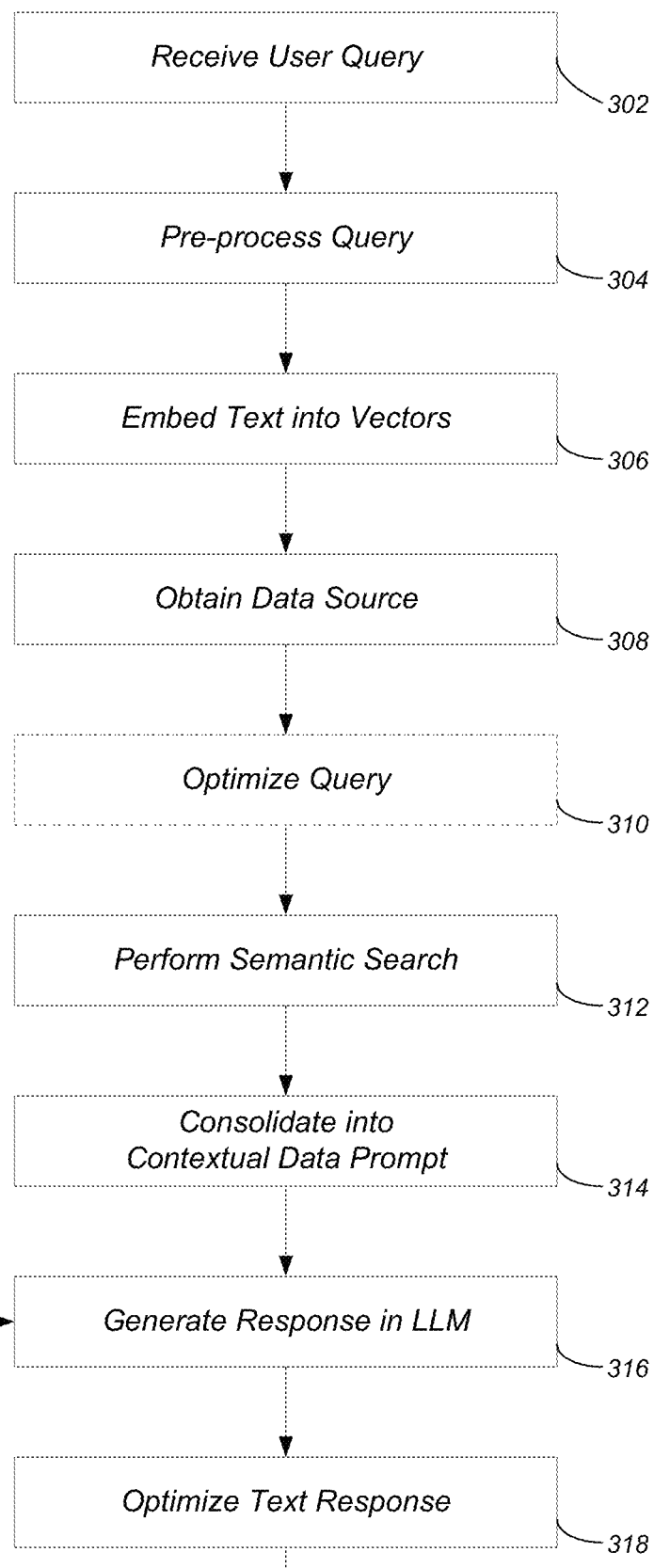
FIG. 3 illustrates the logical flow for using generative AI to process user queries in the construction domain in accordance with one or more embodiments of the invention.

FIG. 3 illustrates the logical flow for using generative AI to process user queries in the construction domain in accordance with one or more embodiments of the invention.

At step 302, a user query is received/obtained (e.g., entered into a text dialog box and/or selected from a list of predefined queries) within a construction software system. In this regard, the user query is a natural language query that may be drafted and entered into a tool in a freeform manner.

At step 304, a user query processing component may perform pre-processing of the user (NL) query including correcting typos, verifying the quality and safety of user input, and rephrasing and complementing user queries (i.e., to validate the query). In this regard, step 304 provides for embedding the text from the pre-processed user query into search vectors for a semantic search.

At step 306, an embedding model may then be utilized to embed the pre-processed text from the query into vectors for the semantic search.

At step 308, a data source is obtained. The data source has multiple different sections and each data source is a vector database with stored vectors representing the multiple different sections.

At step 310, an optional information retrieval strategy is utilized to optimize information retrieval (e.g., in order to conduct a reliable semantic search). Optimization strategies may include the use of: (a) a chunking method (e.g., a method to chunk a document into text segments); (b) a similarity score (e.g., utilized for measuring the text relevancy for the information retrieval); (c) retrievers (e.g., an algorithm utilized for retrieving relevant texts searching strategy; and/or (d) a searching strategy (e.g., a method to determining where to search and what chunks to retrieve).

At step 312, the semantic search is performed within each of the multiple different sections based on the search vectors and the stored vectors. The semantic search identifies the semantically relevant sections of the multiple different sections (i.e., the semantic search filters the data in the data source to improve the search quality and accuracy). The semantic search may further summarize the relevant sections.

At step 314, the semantically relevant sections (identified in the semantic search) are consolidated/aggregated (e.g., based on relevancy) into a contextual data prompt.

At step 316, an LLM is utilized to generate a response based on the contextual data prompt. In this regard, the LLM is trained based on construction data and the response identifies the semantically relevant section(s). One may also note that LLMs of the prior art have a problem of making decisions as well as inaccuracies (i.e., hallucinations). In contrast, construction information requires accuracy and precision. Accordingly, the LLM of the present invention is specifically trained utilizing construction information which is a differentiating factor compared to LLMs of the prior art.

At step 312, a (text) response and identification of the semantically relevant sections is output. This step may include utilizing optimized text generation techniques to ensure the response quality. For example, optimized text generation techniques may include prompt engineering for the text generation LLM, a safety check of the LLM answer/response, and/or a hallucination check of the LLM answer (e.g., whether the LLM answer is accurate and/or has generated an invalid/inapplicable answer).

It may be noted that the consolidation/aggregation of the relevant sections can improve the accuracy of the search results. For example, suppose a user is looking for a manufacturer of doors and the specification describes manufacturers of doors as well as the manufacturers of other items. A search in accordance with the prior art would search for the manufacturer of all things. In contrast, the embodiments of the invention separates the specification into sections and in outputting a response would focus on the section that describes door manufacturers (e.g., and would not provide an answer that describes concrete manufacturers). In this regard, the relevancy of a section (as determined based on the original user input query) directly affects the output generated by the LLM.

Once output, the results/answer may then be fed back into the LLM which may also include prompt the user for (an) additional NL query that further refines the answer/response (and/or may generate a new/additional response/output). Such additional input may also be used to refine and update the LLM model so that more accurate/relevant answers are provided for future queries.

In view of the above, embodiments of the invention provide a method and system that combines semantic queries with an LLM to generate a response to a user input NL query. Such a response may include drafting (e.g., an email, a report, an analysis, a document, etc.) and/or the pulling/retrieval of information from one (or multiple) data sources such as a construction specification.

System Architecture Components

To enable the capabilities of embodiments of the invention the following describes exemplary components of the system architecture.

Figure 4:
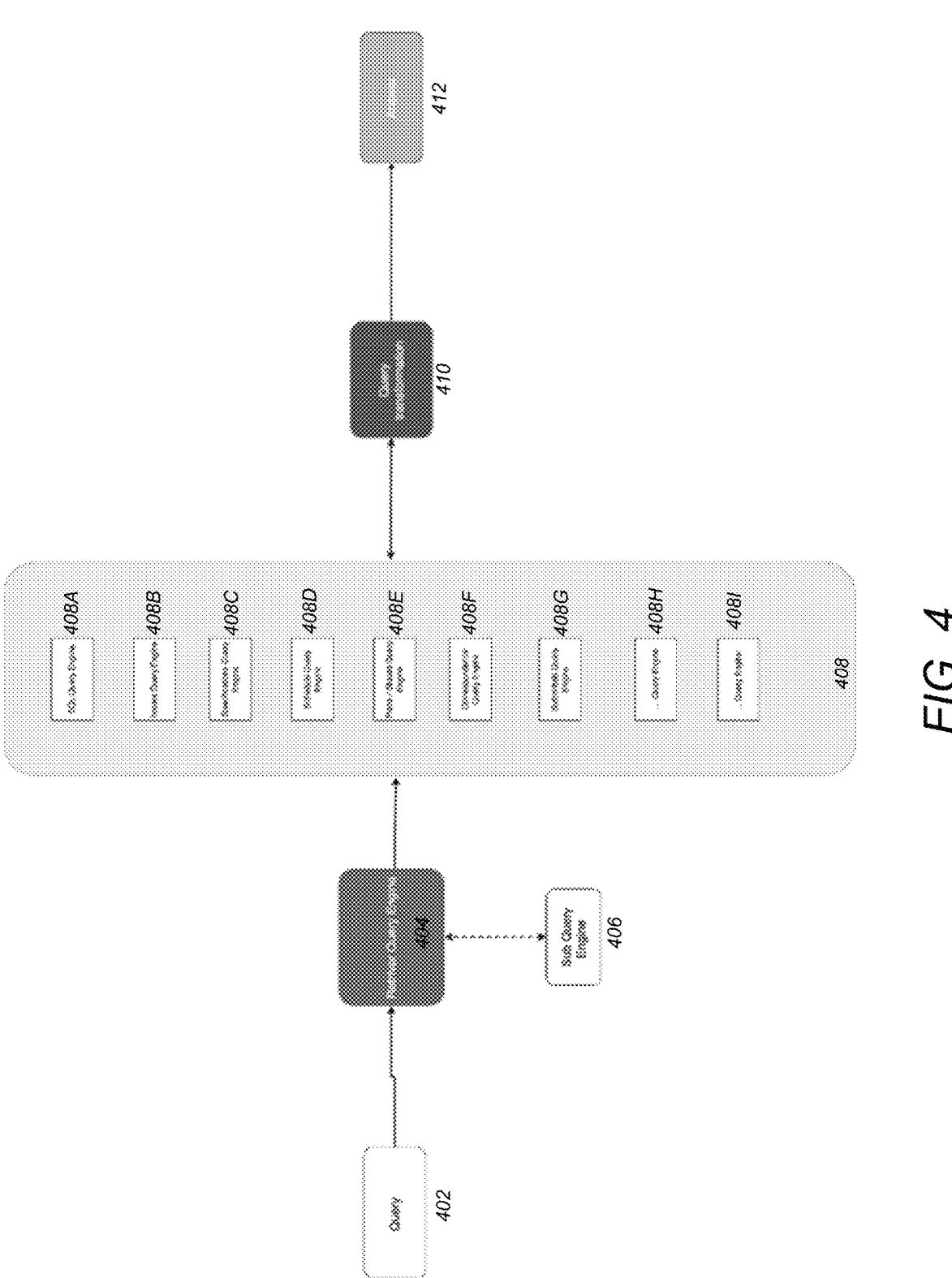
FIG. 4 illustrates a query engine abstraction utilized to perform the generative AI searches in accordance with one or more embodiments of the invention.

FIG. 4 illustrates a query engine abstraction utilized to perform the generative AI searches in accordance with one or more embodiments of the invention. As illustrated, a query is received at 402 into a query retriever engine 404. The subquery engine 406 may perform operations and interact with the retriever query engine 404 to modify the query 402. The retriever query engine 404 accesses various engines 408 that each accesses different datasets. For example, the SQL query engine 408A may generate general SQL queries that access relational datasets. Similarly, issues query engine 408B access the issues dataset, specifications query engine 408C accesses the specifications dataset, schedule query engine 408D accesses the schedule dataset, plans/sheets query engine 408E accesses the plans/sheets dataset, correspondence query engine 408F accesses the correspondence dataset, submittal query engine 408G accesses the submittals dataset, and additional query engines 408H and 408I access other respective datasets. Collectively query engines 408A-408I are referred to as query engines 408. The query may be transformed at 410 and an answer is generated and provided at 412.

Figure 5:
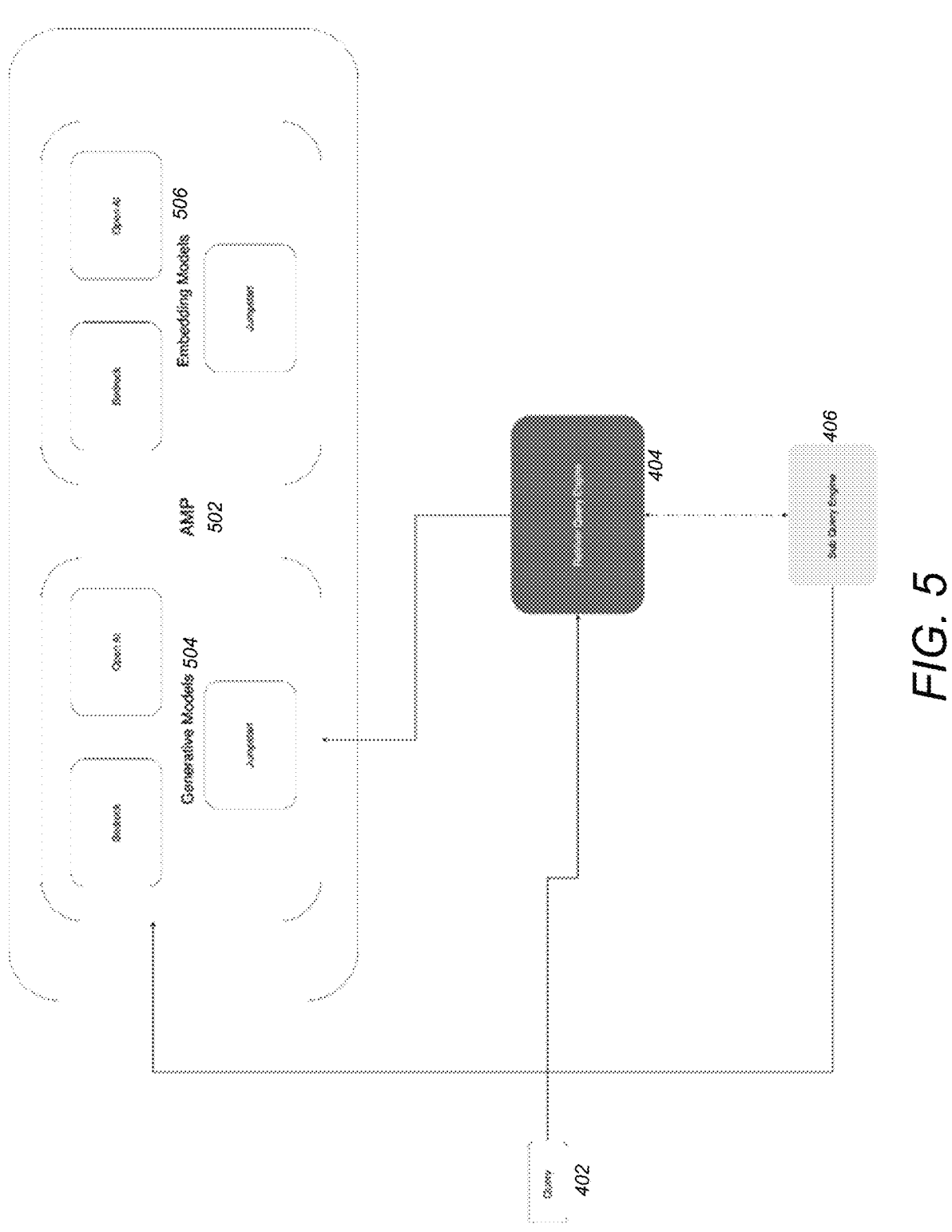
FIG. 5 illustrates the details for a query retriever engine 404 in accordance with one or more embodiments of the invention.

FIG. 5 illustrates the details for a query retriever engine 404 in accordance with one or more embodiments of the invention. As illustrated, the retriever query engine 404 passes the query onto the AMP (AUTODESK MACHINE LEARNING PLATFORM) 502 which includes generative models 504 and embedding models 506. The generative and embedding models are large language models (LLMs) and may be created consistent with publicly available LLMs such as OpenAI and/or those available from AMAZON such as BEDROCK and JUMPSTART.

Figure 6:
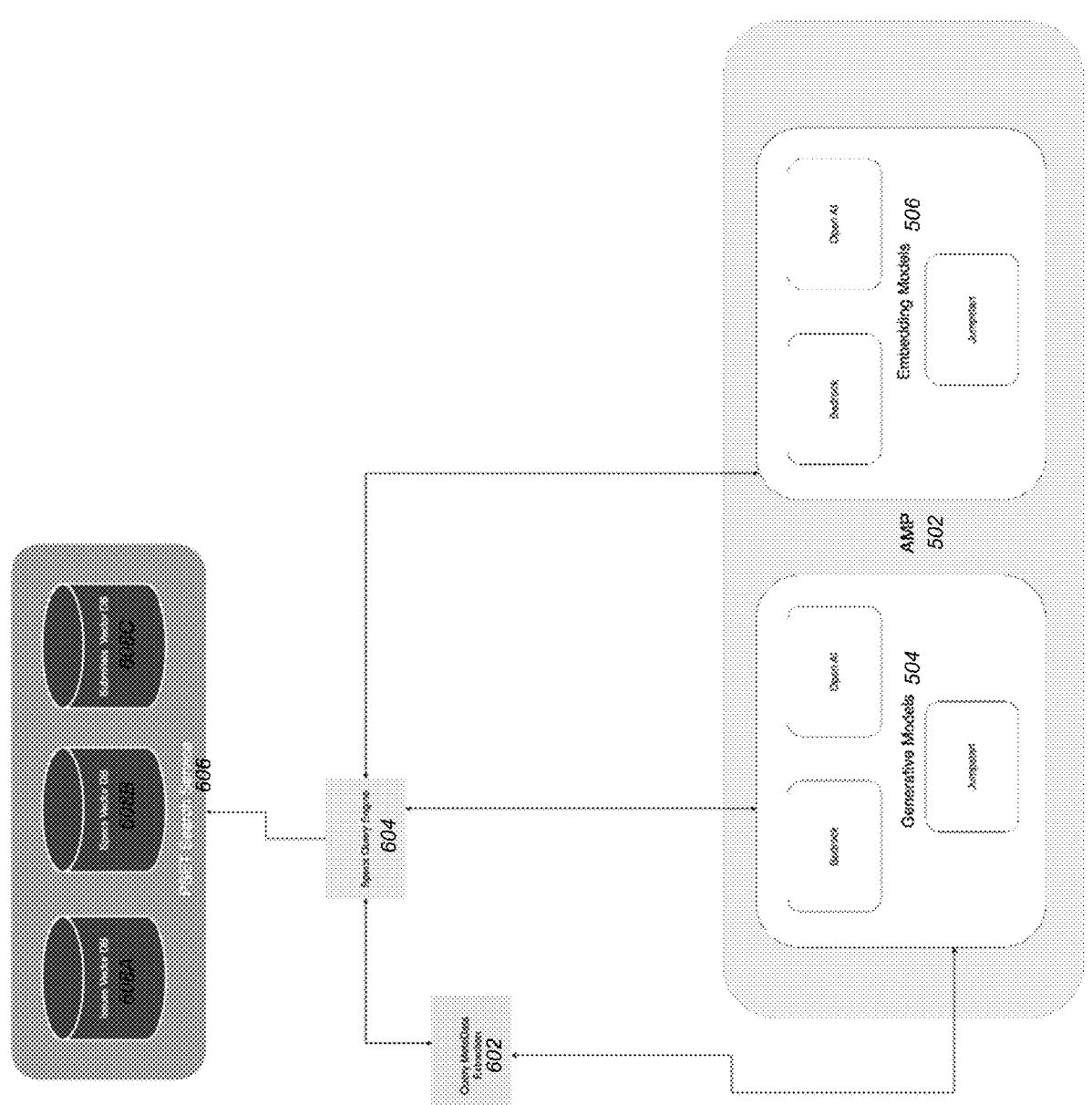
FIG. 6 illustrates query engine architecture details in accordance with one or more embodiments of the invention.

FIG. 6 illustrates query engine architecture details in accordance with one or more embodiments of the invention. As illustrated, query metadata is extracted 602 via the AMPs 502 and provides the query and metadata to the specs query engine 604.

An OpenSearch vector store may be utilized as a dedicated repository for storing embedding vectors that are associated with specification chunks. This storage facility is designed to efficiently manage and index vector data, allowing for rapid and precise retrieval of information related to spec chunks within the system.

An API (application programming interface) may be established to the PSET (Platform Services and Emerging Technologies) vector store/search service 606. Such an API facilitates the seamless ingestion of vectors into a PSET vector database. This API will provide a standardized interface through which vectors can be uploaded and incorporated into the database, ensuring the availability of up-to-date vector information. As illustrated, an exemplary vector store may include the issues vector database 608A, a specs vector database 608B, and a submittals vector database 608C (collectively referred to as vector store/database 608).

An API to update vectors may allow for the refreshing of vectors in the PSET vector database 608. When changes occur in the embedding model or product data, this API will be utilized to efficiently update the vectors, ensuring that the database 608 consistently reflects the most current information.

An API to Specs data may enable the seamless transfer of data from the Specs module (e.g., generative models 504) to embedding vectors (e.g., via the embedding models module 506). This API will provide access to the Specs data, allowing for efficient extraction and conversion of pertinent information for use in the embedding process.

A Connection between Specs data to an OpenSearch vector store may be utilized. The embedding vectors is generated based on Specs data. A connection may be needed from Specs data to the vector database 608 in order to generate embeddings for the Specs data.

An automatic refresh of the embedding vectors in the PSET vector store 608 addresses the automatic refresh of embedding vectors in the PSET vector store 608. Further, the refresh develops a change detection mechanism within the pipeline that continuously monitors the Specs data source 608B for any modifications or additions. It also provides an event-driven trigger that initiates the refresh process whenever a change or addition is detected in the Specs data (within specs vector database 608B). In addition, upon trigger activation, the relevant data that has been modified or added in Specs 608B can be retrieved. This data may include new specifications, updates, or any other relevant information.

An API may take user query input. For semantic searches, the user query must be converted to an embedding. OpenSearch hybrid search may also require an embedded user query. Embodiments of the invention may provide an API to pass the user query through to an OpenSearch module to automatically generate embeddings, or pass through an embedded user query if the OpenSearch module does not support the former (i.e., the user query).

Model deployment and management may also be required for both the embedding model and text generation LLMs.

Figure 7:
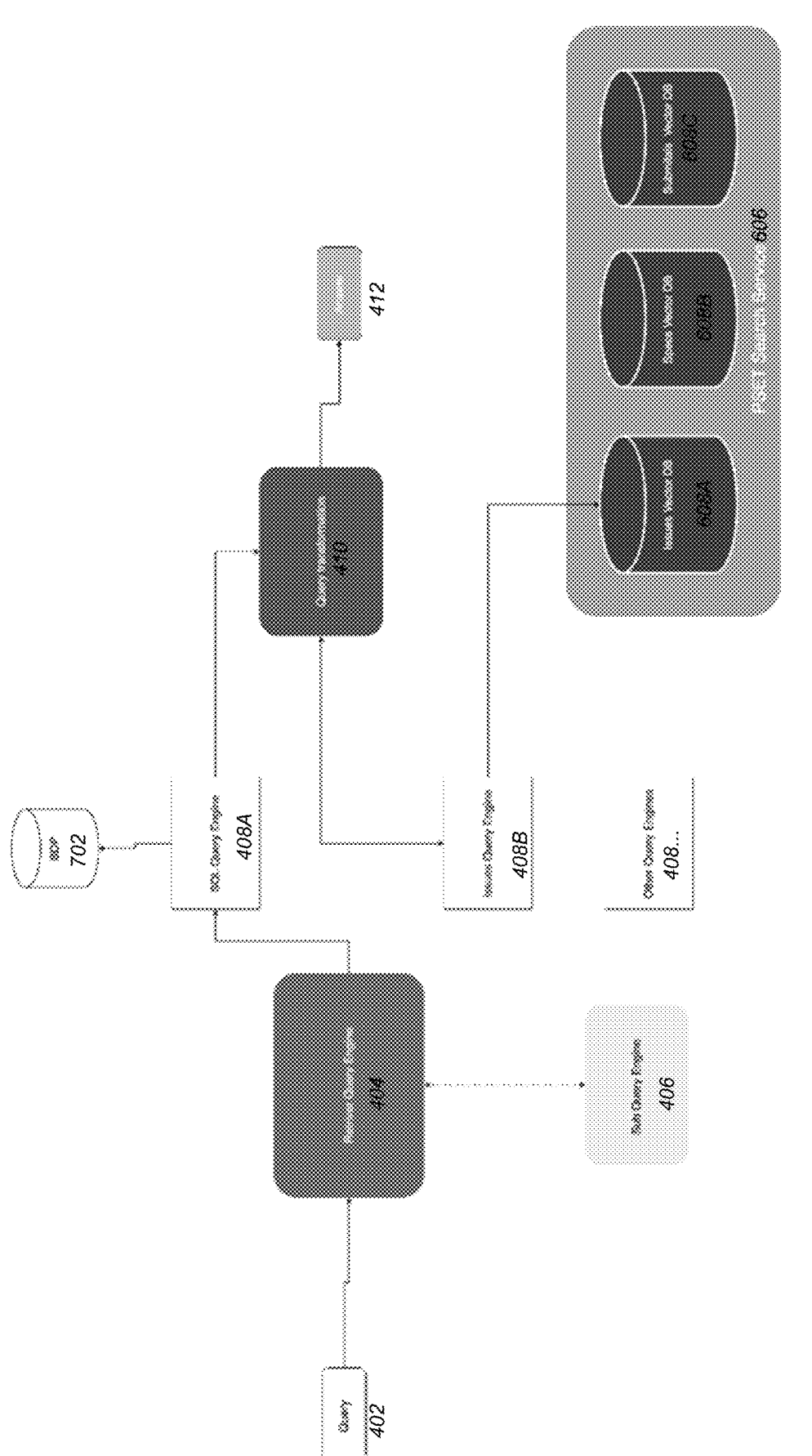
FIG. 7 illustrates an exemplary workflow diagram of processing user input queries through an LLM to generate an answer in accordance with one or more embodiments of the invention.

In view of the description above, FIG. 7 illustrates an exemplary workflow diagram of processing user input queries through an LLM to generate an answer in accordance with one or more embodiments of the invention. Specifically, FIG. 7 illustrates the processing of a query 402 for which the answer involves looking into structured data like BDP 702 and unstructured data indexed in PSET 606. Generally, BDP 702 serves as a filter to the window of structured data that is to be accessed. Sample user queries 402 may include "how many RFIs related to construction drawings raised in the last 2 months", "show me all warranties required for electrical equipment per the specification", and "show me all warranties required for electrical and HVAC equipment per the specification". As illustrated, the query 502 is retrieved/received into query engine 404 (which may generate subqueries via subquery engine 406). The queries 402 are then passed onto the appropriate query engine 408 (which in the case illustrated in SQL query engine 408A) which retrieves structured data from BDP 702. The query is transformed at 410 and additional data is retrieved via issues query engine 408B that accesses the unstructured data 608 indexed/available via PSET search service 606. The answer 412 is then generated and output.

In an alternative example/workflow, if the answer 412 can be derived from an unstructured data source (only), then the SQL query engine 408A is not needed to access BDP data 702 and instead, all of the data is retrieved via the PSET search service 606. In other words, in such an example, this is a kind of query where the answer can be derived form a single document/unstructured data source such as Specifications, Contracts, etc. An exemplary user query may be "What are the temperature requirements for concrete given in the specification".

In yet another example/workflow, the answer 412 may be entirely/directly derived form a structured data source (such as BDP 702). Such a workflow usually applies for analytics and insights driven queries that users may pose. Exemplary user queries may include: "How many overdue submittals are there in the project", "What is the average time to close design issues", "What is the average time to close RFIs", "How many high risk RFIs I have per million dollar of project value", and "What is the average time to approve submittals". In such an embodiment, the retriever query engine 404 would only access the SQL query engine 408A and the query transformation 410 would not access/communicate with other query engines 408.

In a last exemplary workflow, the answer may be derived from a combination of multiple structured data sources. This is a kind of query where the answers are derived by connecting multiple unstructured document sources. Exemplary user queries include "Is this submittal In accordance with the tile flooring specifications", "Is this submittal in accordance with the backsplash finishes requirements", and "Compare all floor finishes in the architectural plans with the specifications". The workflow of FIG. 7 would be adjusted with the retriever query engine 404 accessing multiple query engines (e.g., 408B, 408C, 408D), etc. and the query transformation 410 communicating with each of those engines 408.

Exemplary Graphical User Interfaces

Figure 8A:
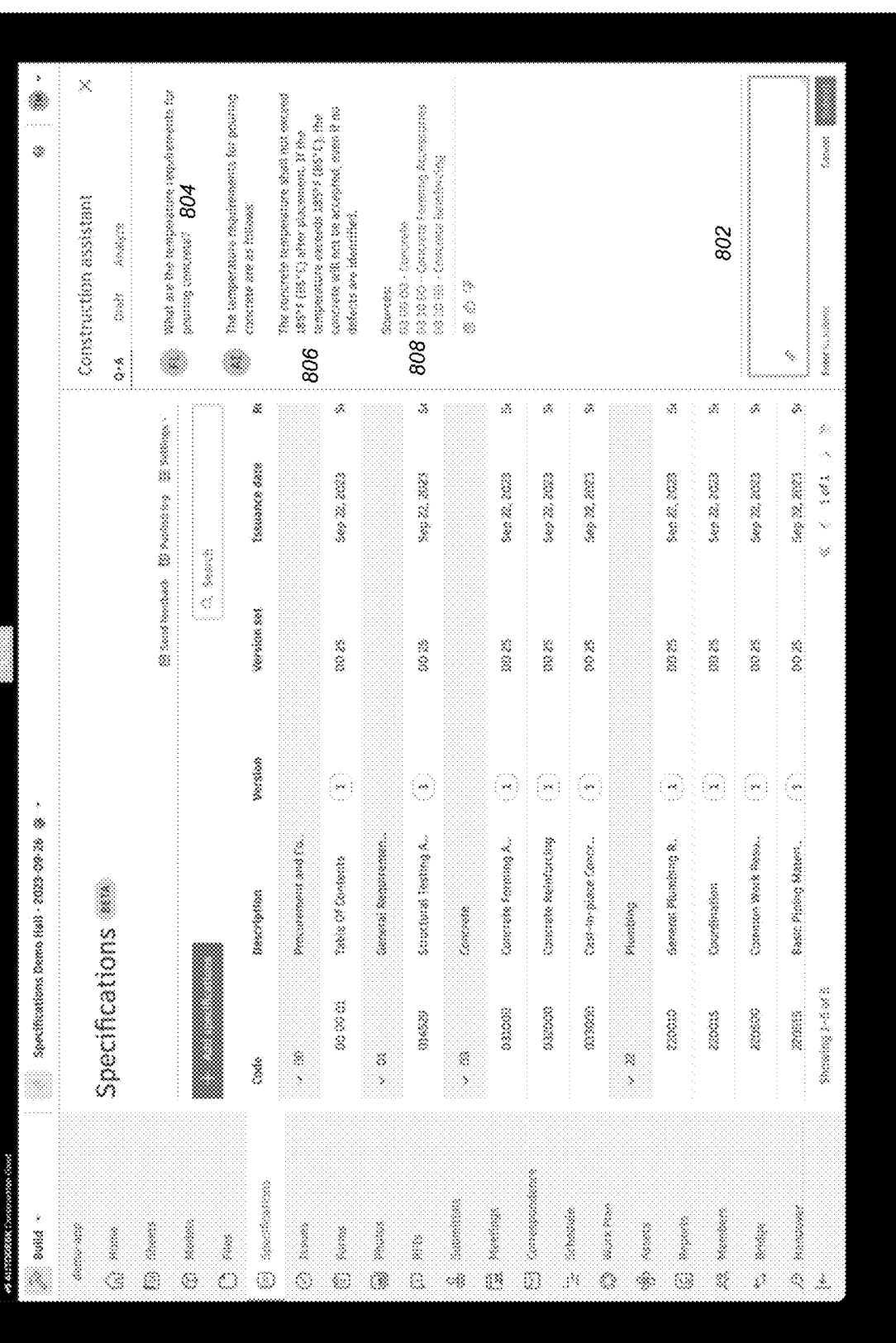
FIGS. 8A-8F illustrate exemplary graphical user interfaces that may be used to provide a construction assistant that utilizes generative AI to respond to natural language queries in accordance with one or more embodiments of the invention.

FIGS. 8A-8F illustrate exemplary graphical user interfaces that may be used to provide a construction assistant that utilizes generative AI to respond to natural language queries in accordance with one or more embodiments of the invention. FIG. 8A illustrates a specification query example where the user has either selected a query or has entered a query in text box 802. The query (as reflected at 804) is "What are the temperature requirements for pouring concrete". The generative AI has analyzed the query and output the answer at 806 along with the relevant sources 808 (i.e., the parts of the specification) that have been identified and used to generate the answer 806.

Figure 8B:
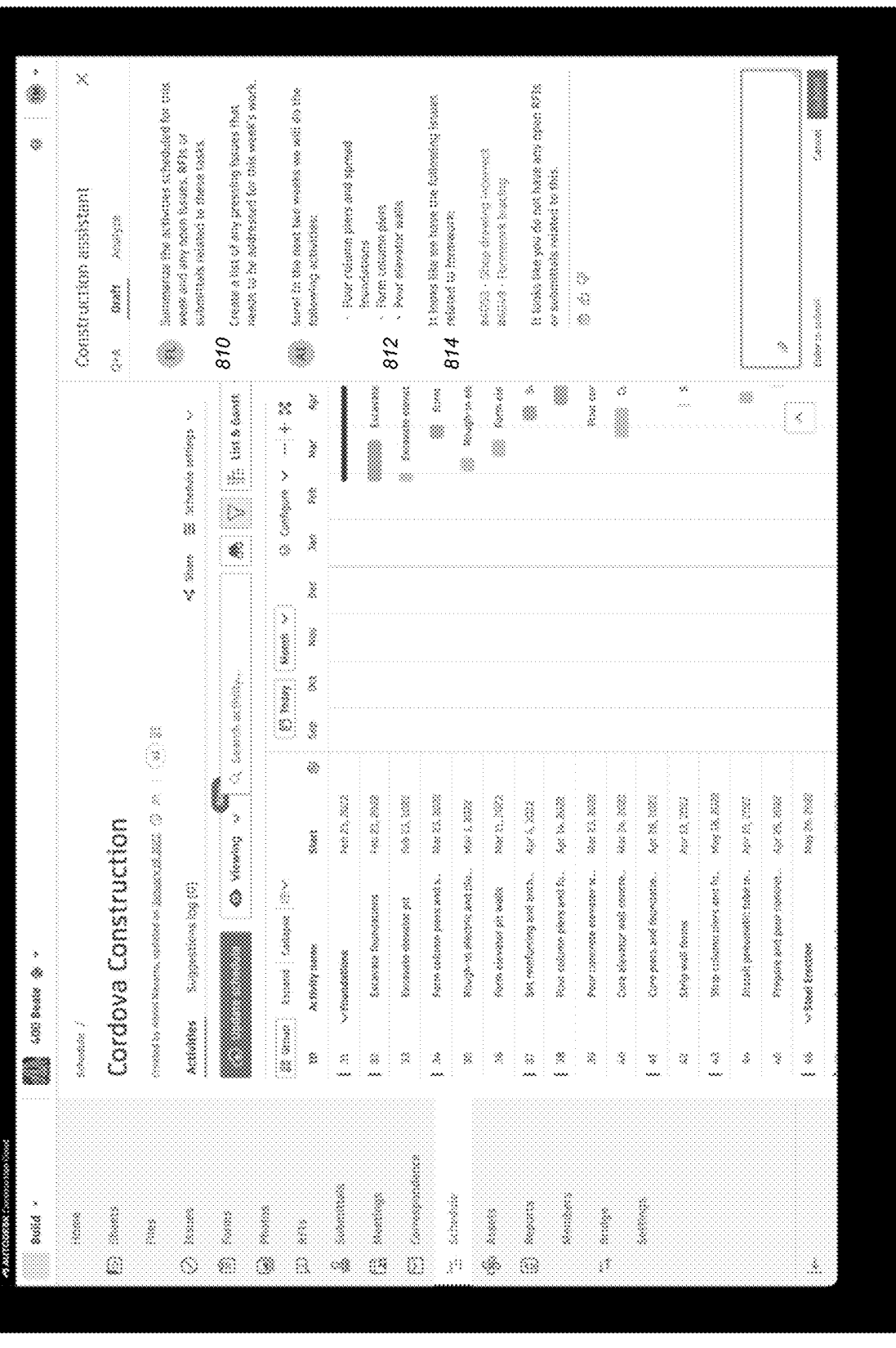

FIG. 8B is an exemplary query of the schedules and open items. The query as illustrated at 810 was "Summarize the activities scheduled for this week and any open issues, RFIs, or submittals related to these tasks. Create a list of any pressing issues that needs to be addressed for this week's work". The answer 812 provides the schedule of activities and a list of the open issues at 814.

Figure 8C:
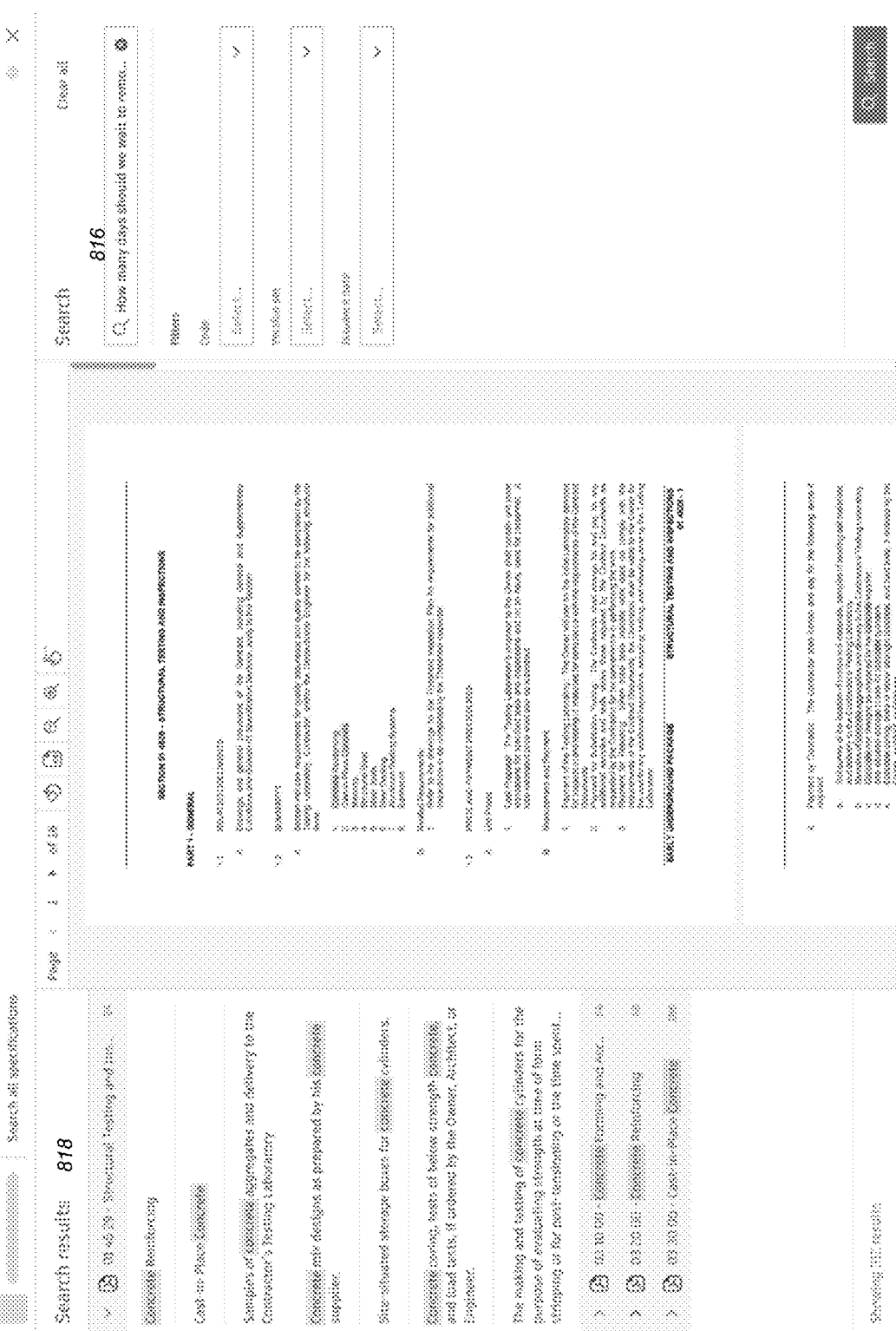

FIG. 8C illustrates an exemplary specification query intelligent search with the user query 816 of "How many days should we wait to remo . . . concrete". The search results are shown at 818 with the relevant keyword "concrete" highlighted where found in the specification document.

Figure 8D:
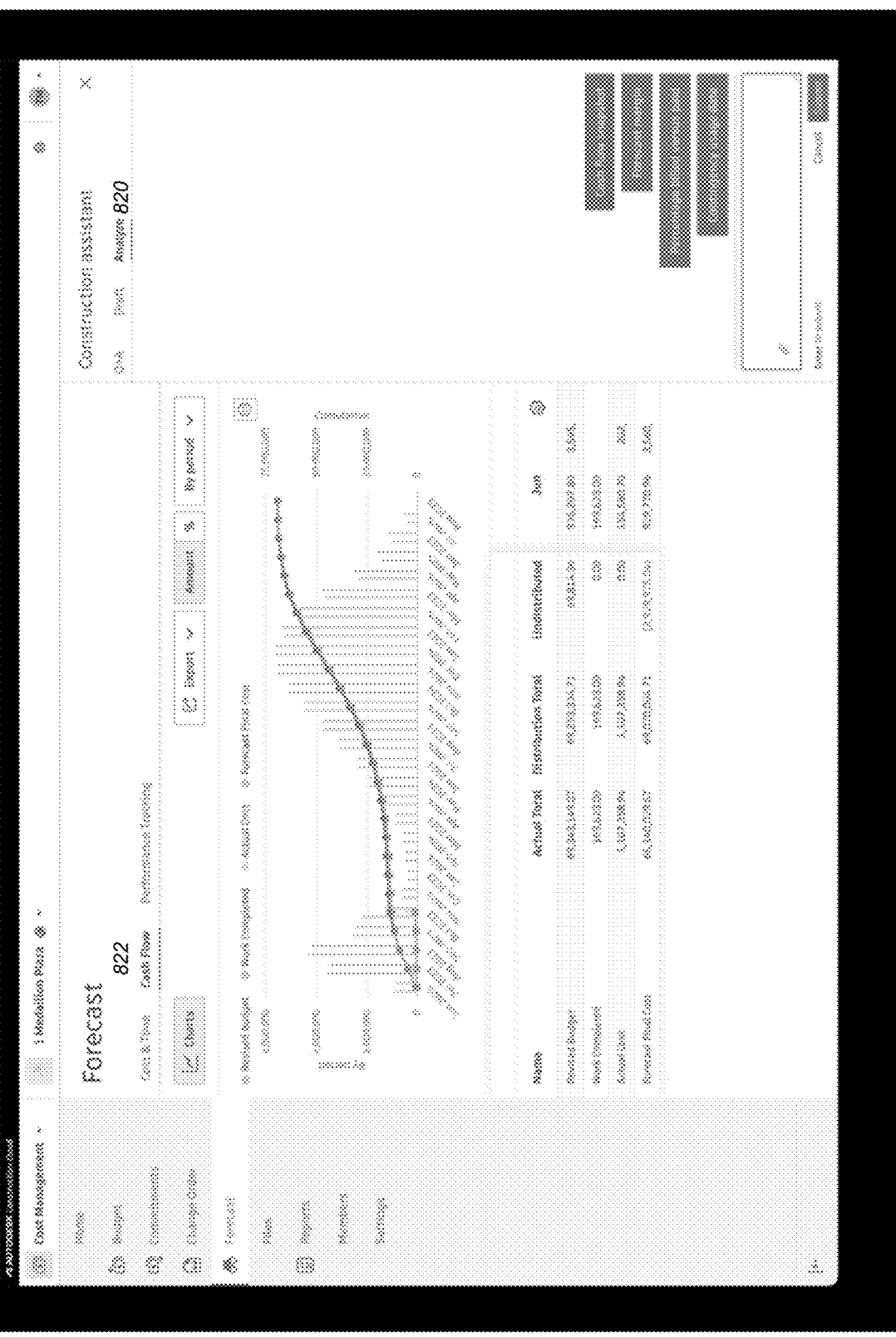

FIG. 8D illustrates an exemplary ad hoc cost analysis where a user has selected an analyze tab 820 and the forecast cash flow analysis 822 is displayed (e.g., via a graph) in response.

Figure 8E:
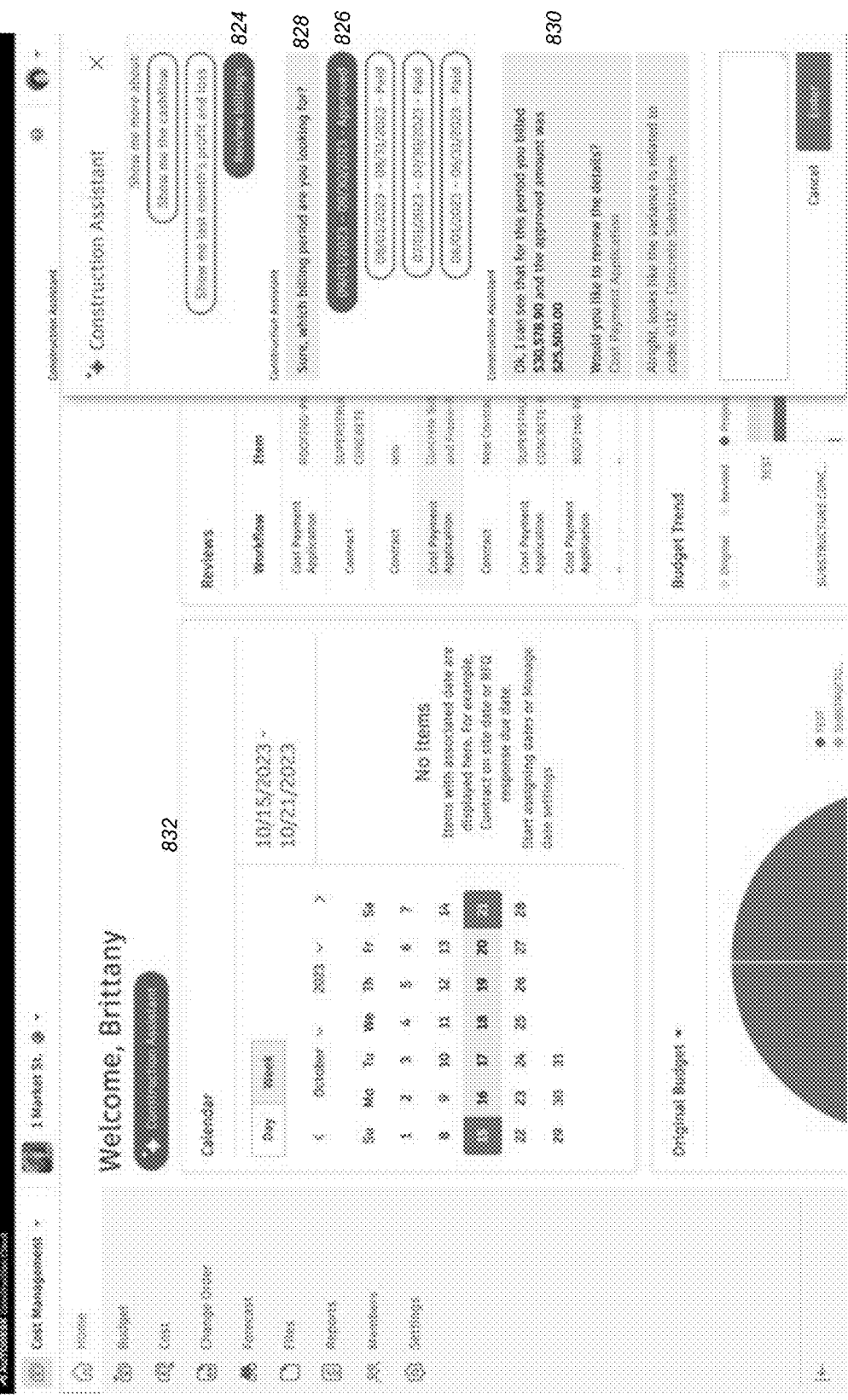

FIG. 8E illustrates an alternative ad hoc cost analysis in response to a series of questions/inputs/queries from the user ("review billings" 824 and billing period 826). As can be seen, the generative AI responds to each input 824 and 826 with an additional question (e.g., question 828) or an answer 830). Area 832 may also be used to display details (e.g., of the prompt such as the dates the user has selected), charts, graphs, etc. for the answer 830.

Figure 8F:
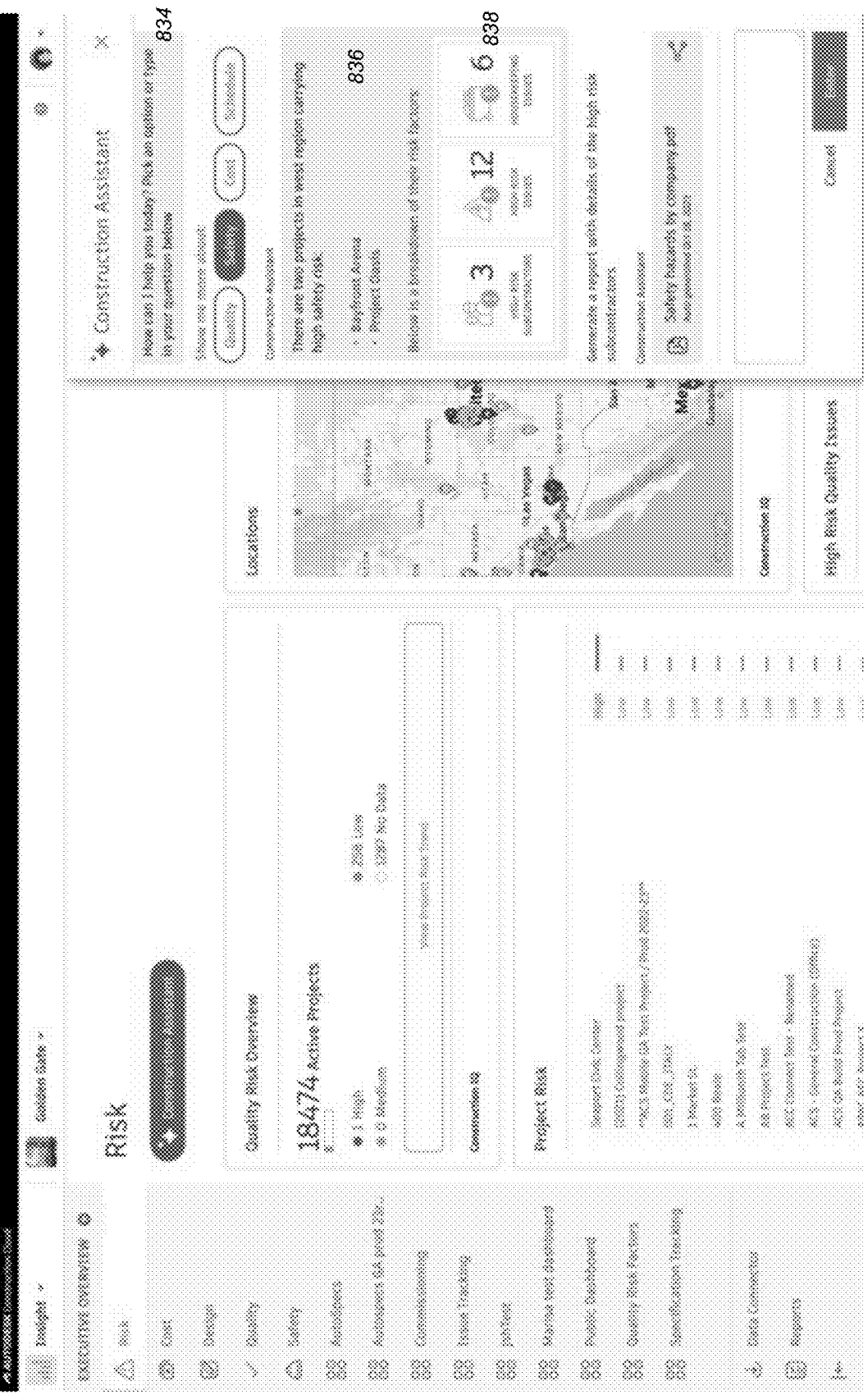

FIG. 8F illustrates a risk analysis answer. Specifically, the user has asked at 834 to see more information about safety and in response, the construction assistant has provided an answer at 836 with the projects with safety risks and a break down of risk factors 838.

Hardware Environment

Figure 9:
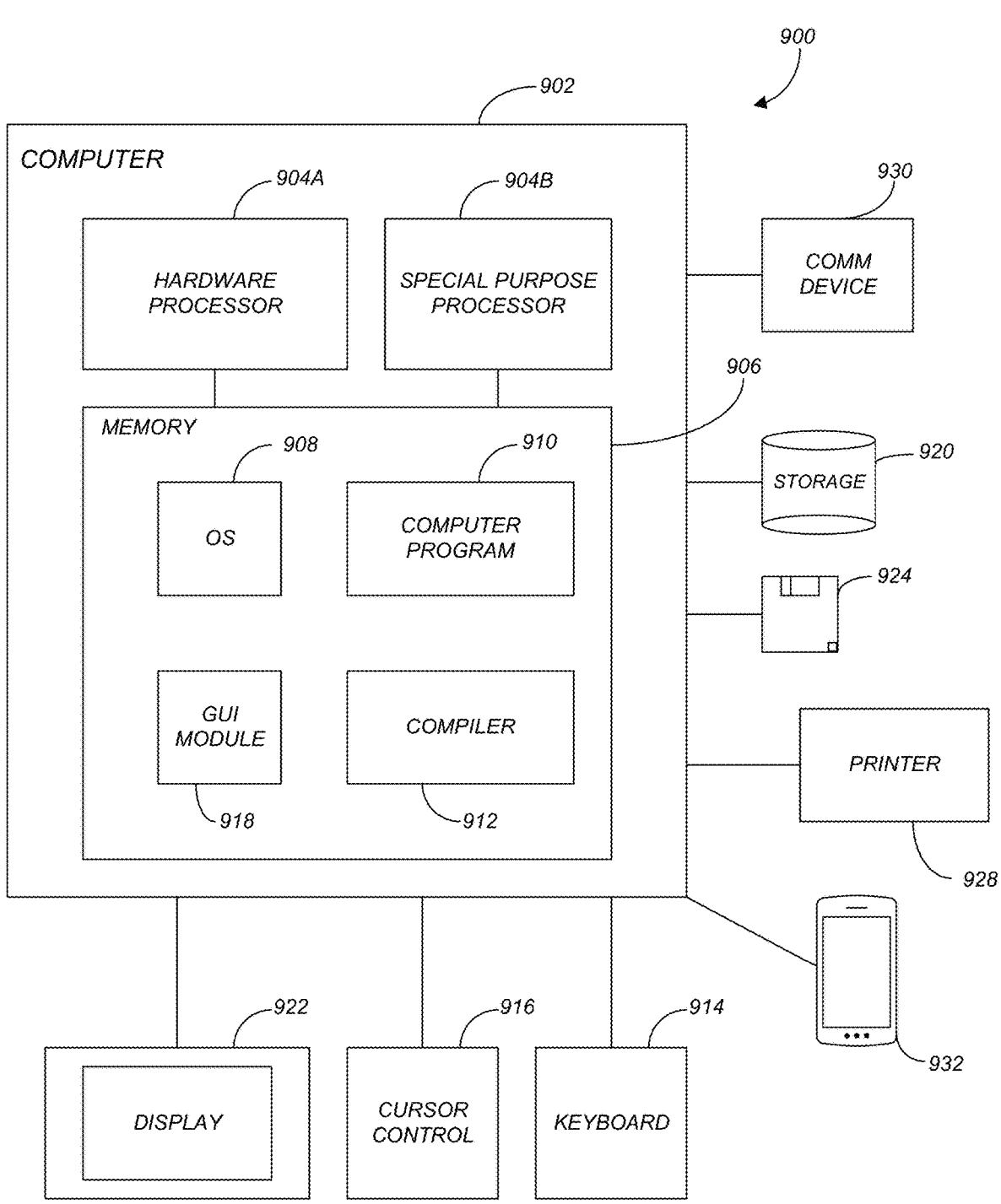
FIG. 9 is an exemplary hardware and software environment used to implement one or more embodiments of the invention.

FIG. 9 is an exemplary hardware and software environment 900 (referred to as a computer-implemented system and/or computer-implemented method) used to implement one or more embodiments of the invention. The hardware and software environment includes a computer 902 and may include peripherals. Computer 902 may be a user/client computer, server computer, or may be a database computer. The computer 902 comprises a hardware processor 904A and/or a special purpose hardware processor 904B (hereinafter alternatively collectively referred to as processor 904) and a memory 906, such as random access memory (RAM). The computer 902 may be coupled to, and/or integrated with, other devices, including input/output (I/O) devices such as a keyboard 914, a cursor control device 916 (e.g., a mouse, a pointing device, pen and tablet, touch screen, multi-touch device, etc.) and a printer 928. In one or more embodiments, computer 902 may be coupled to, or may comprise, a portable or media viewing/listening device 932 (e.g., an MP3 player, IPOD, NOOK, portable digital video player, cellular device, personal digital assistant, etc.). In yet another embodiment, the computer 902 may comprise a multi-touch device, mobile phone, gaming system, internet enabled television, television set top box, or other internet enabled device executing on various platforms and operating systems.

In one embodiment, the computer 902 operates by the hardware processor 904A performing instructions defined by the computer program 910 (e.g., a computer-aided design [CAD] application) under control of an operating system 908. The computer program 910 and/or the operating system 908 may be stored in the memory 906 and may interface with the user and/or other devices to accept input and commands and, based on such input and commands and the instructions defined by the computer program 910 and operating system 908, to provide output and results.

Output/results may be presented on the display 922 or provided to another device for presentation or further processing or action. In one embodiment, the display 922 comprises a liquid crystal display (LCD) having a plurality of separately addressable liquid crystals. Alternatively, the display 922 may comprise a light emitting diode (LED) display having clusters of red, green and blue diodes driven together to form full-color pixels. Each liquid crystal or pixel of the display 922 changes to an opaque or translucent state to form a part of the image on the display in response to the data or information generated by the processor 904 from the application of the instructions of the computer program 910 and/or operating system 908 to the input and commands. The image may be provided through a graphical user interface (GUI) module 918. Although the GUI module 918 is depicted as a separate module, the instructions performing the GUI functions can be resident or distributed in the operating system 908, the computer program 910, or implemented with special purpose memory and processors.

In one or more embodiments, the display 922 is integrated with/into the computer 902 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 902 according to the computer program 910 instructions may be implemented in a special purpose processor 904B. In this embodiment, some or all of the computer program 910 instructions may be implemented via firmware instructions stored in a read only memory (ROM), a programmable read only memory (PROM) or flash memory within the special purpose processor 904B or in memory 906. The special purpose processor 904B may also be hardwired through circuit design to perform some or all of the operations to implement the present invention. Further, the special purpose processor 904B may be a hybrid processor, which includes dedicated circuitry for performing a subset of functions, and other circuits for performing more general functions such as responding to computer program 910 instructions. In one embodiment, the special purpose processor 904B is an application specific integrated circuit (ASIC).

The computer 902 may also implement a compiler 912 that allows an application or computer program 910 written in a programming language such as C, C++, Assembly, SQL, PYTHON, PROLOG, MATLAB, RUBY, RAILS, HASKELL, or other language to be translated into processor 904 readable code. Alternatively, the compiler 912 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 910 accesses and manipulates data accepted from I/O devices and stored in the memory 906 of the computer 902 using the relationships and logic that were generated using the compiler 912.

The computer 902 also optionally comprises an external communication device such as a modem, satellite link, Ethernet card, or other device for accepting input from, and providing output to, other computers 902.

In one embodiment, instructions implementing the operating system 908, the computer program 910, and the compiler 912 are tangibly embodied in a non-transitory computer-readable medium, e.g., data storage device 920, which could include one or more fixed or removable data storage devices, such as a zip drive, floppy disc drive 924, hard drive, CD-ROM drive, tape drive, etc. Further, the operating system 908 and the computer program 910 are comprised of computer program 910 instructions which, when accessed, read and executed by the computer 902, cause the computer 902 to perform the steps necessary to implement and/or use the present invention or to load the program of instructions into a memory 906, thus creating a special purpose data structure causing the computer 902 to operate as a specially programmed computer executing the method steps described herein. Computer program 910 and/or operating instructions may also be tangibly embodied in memory 906 and/or data communications devices 930, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 902.

Figure 10:
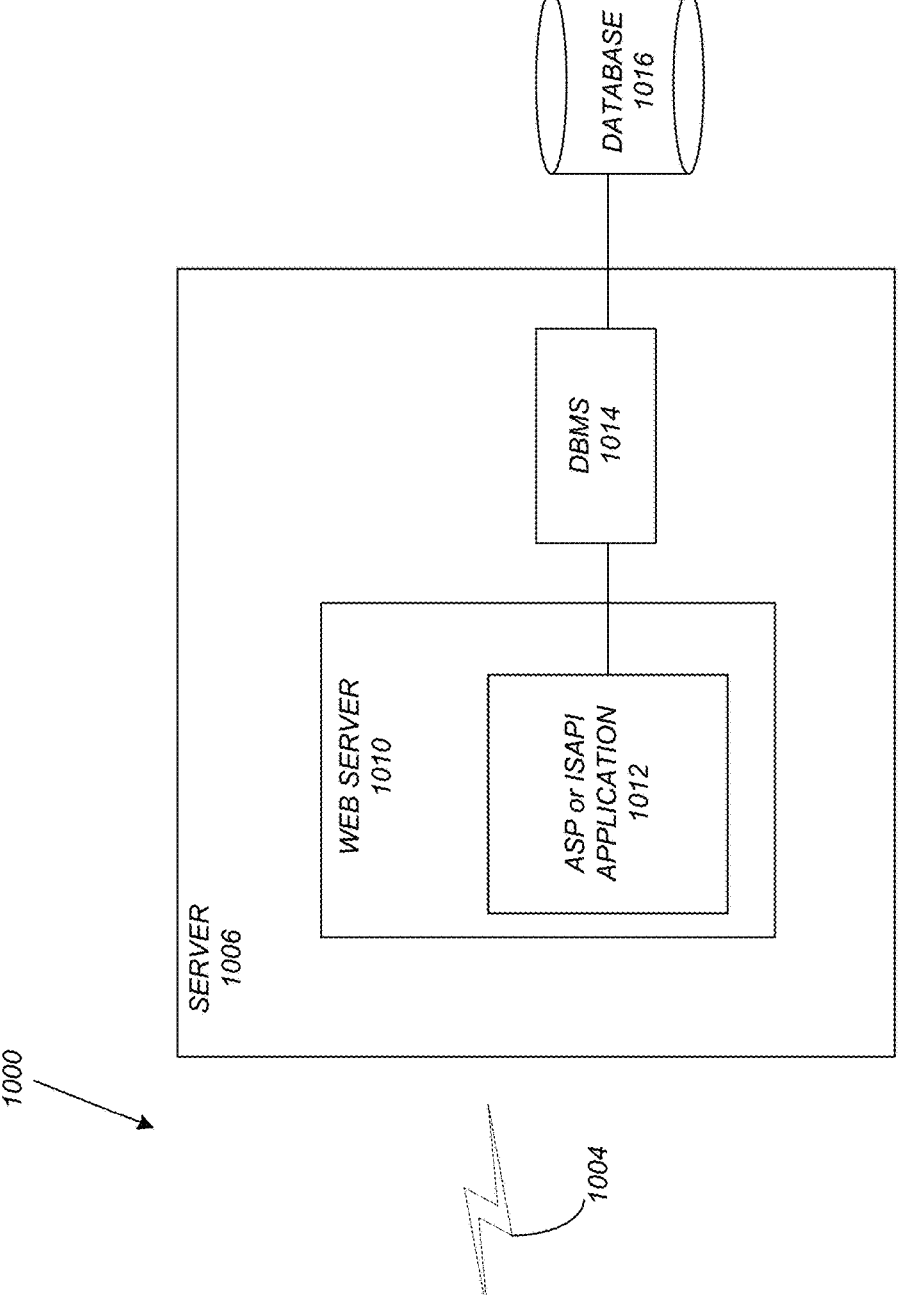
FIG. 10 schematically illustrates a typical distributed/cloud-based computer system in accordance with one or more embodiments of the invention.

FIG. 10 schematically illustrates a typical distributed/cloud-based computer system 1000 using a network 1004 to connect client computers 1002 to server computers 1006. A typical combination of resources may include a network 1004 comprising the Internet, LANs (local area networks), WANs (wide area networks), SNA (systems network architecture) networks, or the like, clients 1002 that are personal computers or workstations (as set forth in FIG. 9), and servers 1006 that are personal computers, workstations, minicomputers, or mainframes (as set forth in FIG. 9). However, it may be noted that different networks such as a cellular network (e.g., GSM [global system for mobile communications] or otherwise), a satellite based network, or any other type of network may be used to connect clients 1002 and servers 1006 in accordance with embodiments of the invention.

A network 1004 such as the Internet connects clients 1002 to server computers 1006. Network 1004 may utilize ethernet, coaxial cable, wireless communications, radio frequency (RF), etc. to connect and provide the communication between clients 1002 and servers 1006. Further, in a cloud-based computing system, resources (e.g., storage, processors, applications, memory, infrastructure, etc.) in clients 1002 and server computers 1006 may be shared by clients 1002, server computers 1006, and users across one or more networks. Resources may be shared by multiple users and can be dynamically reallocated per demand. In this regard, cloud computing may be referred to as a model for enabling access to a shared pool of configurable computing resources.

Clients 1002 may execute a client application or web browser and communicate with server computers 1006 executing web servers 1010. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 1002 may be downloaded from server computer 1006 to client computers 1002 and installed as a plug-in or ACTIVEX control of a web browser. Accordingly, clients 1002 may utilize ACTIVEX components/component object model (COM) or distributed COM (DCOM) components to provide a user interface on a display of client 1002. The web server 1010 is typically a program such as MICROSOFT'S INTERNET INFORMATION SERVER.

Web server 1010 may host an Active Server Page (ASP) or Internet Server Application Programming Interface (ISAPI) application 1012, which may be executing scripts. The scripts invoke objects that execute business logic (referred to as business objects). The business objects then manipulate data in database 1016 through a database management system (DBMS) 1014. Alternatively, database 1016 may be part of, or connected directly to, client 1002 instead of communicating/obtaining the information from database 1016 across network 1004. When a developer encapsulates the business functionality into objects, the system may be referred to as a component object model (COM) system. Accordingly, the scripts executing on web server 1010 (and/or application 1012) invoke COM objects that implement the business logic. Further, server 1006 may utilize MICROSOFT'S TRANSACTION SERVER (MTS) to access required data stored in database 1016 via an interface such as ADO (Active Data Objects), OLE DB (Object Linking and Embedding DataBase), or ODBC (Open Data-Base Connectivity).

Generally, these components 1000-1016 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1002 and 1006 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1002 and 1006. Embodiments of the invention are implemented as a software/CAD application on a client 1002 or server computer 1006. Further, as described above, the client 1002 or server computer 1006 may comprise a thin client device or a portable device that has a multi-touch-based display.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for processing a construction domain query, comprising:

obtaining a user query comprising a natural language query within a construction software system;

pre-processing the user query to validate the query;

embedding text from the preprocessed user query into search vectors for a semantic search;

obtaining a data source comprising multiple different sections, wherein the data source comprises a vector database with stored vectors representing the multiple different sections;

performing the semantic search within each of the multiple different sections, based on the search vectors and the stored vectors, wherein the semantic search identifies semantically relevant sections of the multiple different sections;

consolidating the semantically relevant sections into a contextual data prompt;

utilizing a large language model (LLM) to generate a response based on the contextual data prompt, wherein the LLM is trained based on construction data, wherein the construction data comprises multiple different data that is siloed within the construction software system, and wherein the response identifies the semantically relevant sections; and outputting the response and identification of the semantically relevant sections.

2. The computer-implemented method of claim 1, wherein the pre-processing comprises correcting typographical errors, verifying a quality and safety of user input, and rephrasing and complementing the user query.

3. The computer-implemented method of claim 1, further comprising:

optimizing information retrieval to improve the semantic search.

4. The computer-implemented method of claim 3, wherein the optimizing utilizes an optimization strategy comprising:

a chunking method that chunks the data source into text segments.

5. The computer-implemented method of claim 3, wherein the optimizing utilizes an optimization strategy comprising:

a similarity score that measures text relevancy.

6. The computer-implemented method of claim 3, wherein the optimizing utilizes an optimization strategy comprising:

a retriever that retrieves relevant text using a searching strategy.

7. The computer-implemented method of claim 3, wherein the optimizing utilizes an optimization strategy comprising:

a searching strategy that determines where to search and what chunks to retrieve.

8. The computer-implemented method of claim 1, wherein the outputting utilizes a text generation optimization that comprises a safety check of the response.

9. The computer-implemented method of claim 1, wherein the outputting utilizes a text generation optimization that comprises a hallucination check of the response.

10. A computer-implemented system for processing a construction domain query, comprising:

(a) a computer having a memory;

(b) a processor executing on the computer;

(c) the memory storing a set of instructions, wherein the set of instructions, when executed by the processor cause the processor to perform operations comprising:

(1) obtaining a user query comprising a natural language query within a construction software system;

(2) pre-processing the user query to validate the query;

(3) embedding text from the preprocessed user query into search vectors for a semantic search;

(4) obtaining a data source comprising multiple different sections, wherein the data source comprises a vector database with stored vectors representing the multiple different sections;

(5) performing the semantic search within each of the multiple different sections, based on the search vectors and the stored vectors, wherein the semantic search identifies semantically relevant sections of the multiple different sections;

(6) consolidating the semantically relevant sections into a contextual data prompt;

(7) utilizing a large language model (LLM) to generate a response based on the contextual data prompt, wherein the LLM is trained based on construction data, wherein the construction data comprises multiple different data that is siloed within the construction software system, and wherein the response identifies the semantically relevant sections; and (8) outputting the response and identification of the semantically relevant sections.

11. The computer-implemented system of claim 10, wherein the pre-processing comprises correcting typographical errors, verifying a quality and safety of user input, and rephrasing and complementing the user query.

12. The computer-implemented system of claim 10, further comprising:

optimizing information retrieval to improve the semantic search.

13. The computer-implemented system of claim 12, wherein the optimizing utilizes an optimization strategy comprising:

a chunking method that chunks the data source into text segments.

14. The computer-implemented system of claim 12, wherein the optimizing utilizes an optimization strategy comprising:

a similarity score that measures text relevancy.

15. The computer-implemented system of claim 12, wherein the optimizing utilizes an optimization strategy comprising:

a retriever that retrieves relevant text using a searching strategy.

16. The computer-implemented system of claim 12, wherein the optimizing utilizes an optimization strategy comprising:

a searching strategy that determines where to search and what chunks to retrieve.

17. The computer-implemented system of claim 10, wherein the outputting utilizes a text generation optimization that comprises a safety check of the response.

18. The computer-implemented system of claim 10, wherein the outputting utilizes a text generation optimization that comprises a hallucination check of the response.

\* \* \* \* \*